United States Patent Office 3,594,123
Patented July 20, 1971

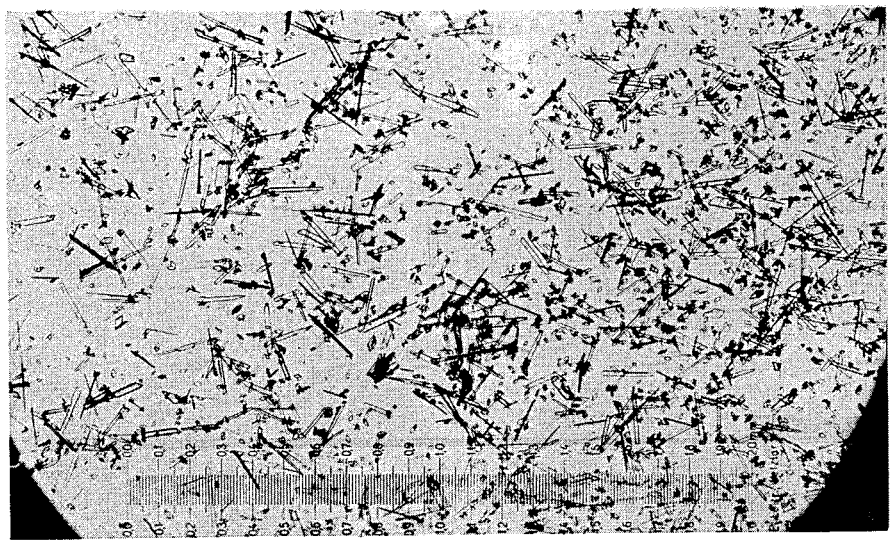
Fig. 1 Sample S-7700-141A (Blank)     60X
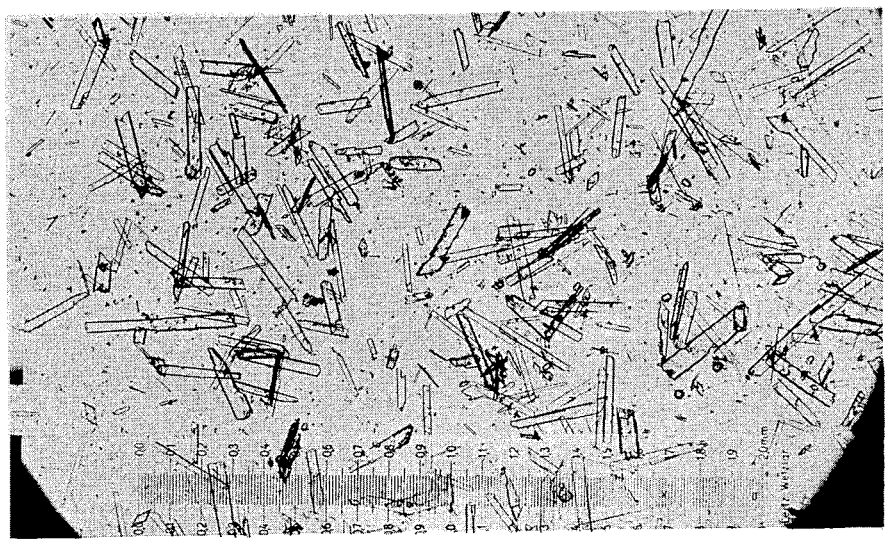
Fig. 2 Sample S-7700-141B (REO 50)     60X
INVENTORS.
EDWARD HELMUT SHEERS
FREDERICK LUDWIG ENCKE
BY
ATTORNEY

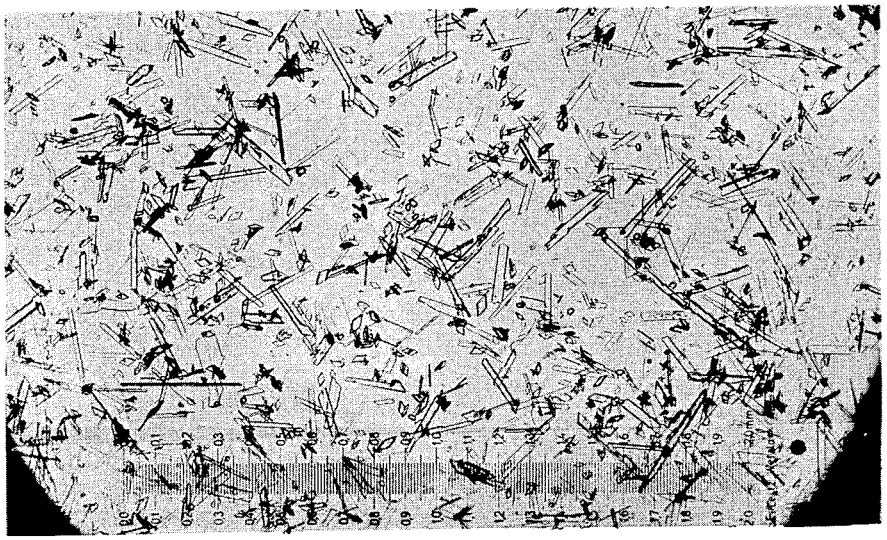
Fig. 3 Sample S-7700-141C (REO 80)     60X
Fig. 4 Sample S-7700-141D (REO 100)     60X
INVENTORS.
EDWARD HELMUT SHEERS
FREDERICK LUDWIG ENCKE
BY
Charles J. Mickey
ATTORNEY

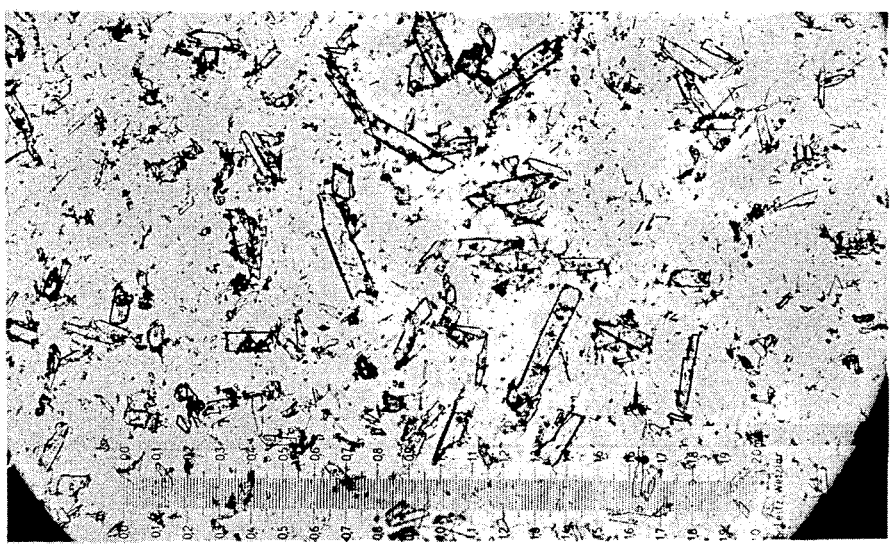
Fig. 5 Sample S-7700-141E  (REO 125)    60X
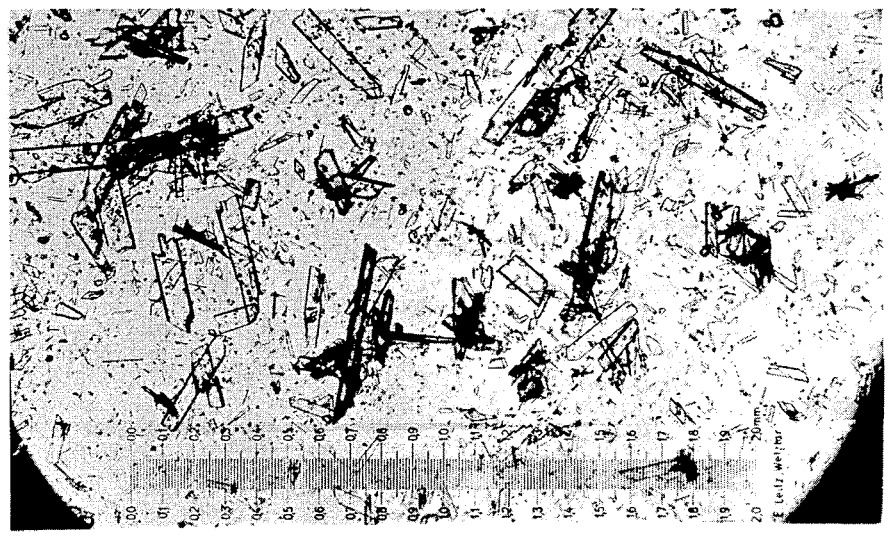
Fig. 6 Sample S-7700-141F  (REO 180)    60X

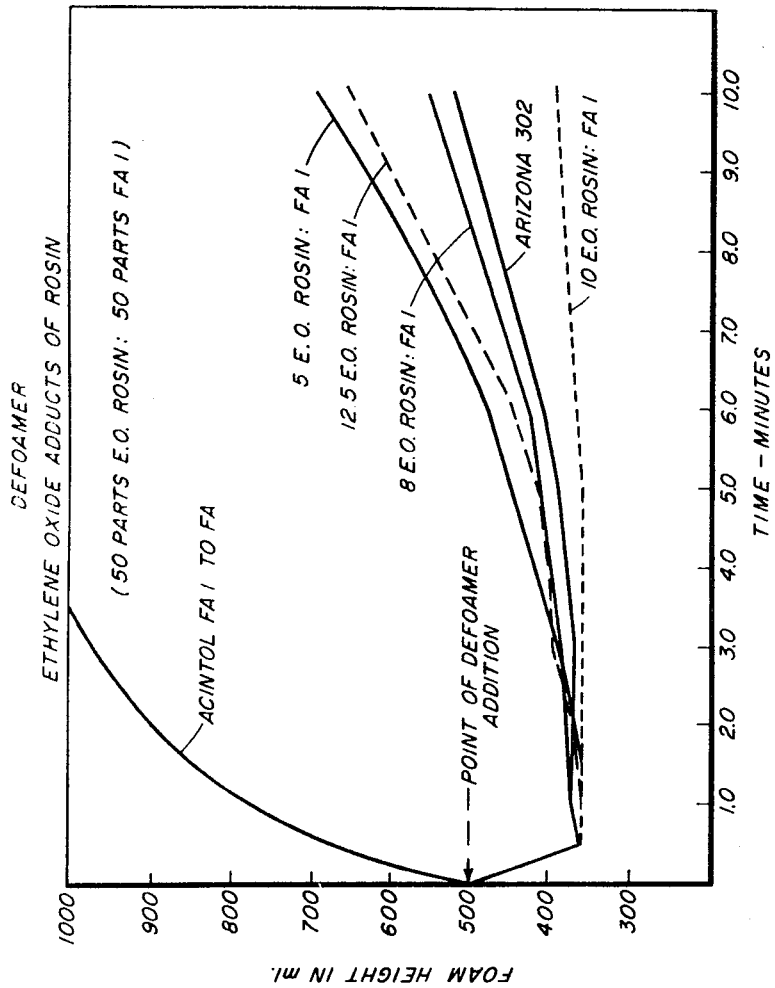

1

3,594,123
ENHANCEMENT OF GYPSUM CRYSTAL GROWTH
IN WET-PROCESS PHOSPHORIC ACID
Frederick Ludwig Encke, Bronx, and Edward Helmut
Sheers, Flushing, N.Y., assignors to Arizona Chemical
Company, New York, N.Y.
Filed Aug. 10, 1967, Ser. No. 659,684
Int. Cl. C01b 25/22; C01f 11/46
U.S. Cl. 23—165             6 Claims

ABSTRACT OF THE DISCLOSURE

Improvements in wet-process phosphoric acid systems comprising adding a composition comprising (1) an adduct obtained by reacting ethylene oxide with tall oil rosin; with or without (2) fatty acids, whereby foam is suppressed and gypsum crystal growth is enhanced.

---

This invention relates to improvements in the wet-process method of producing phosphoric acid.

The wet-process method of producing phosphoric acid consists in reacting phosphate rock (calcium phosphate) with sulphuric acid in an environment containing reaction product phosphoric acid and the reaction product gypsum in accordance with the general chemical equation:

$$3H_2SO_4 + Ca_3(PO_4)_2 + 6H_2O \rightarrow 2H_3PO_4 + 3CaSO_4 \cdot 2H_2O$$

In the process, it is desirable to avoid foaming of the reaction mixture, since this causes loss of phosphoric acid through the overflow equipment and permits the phosphoric acid to get into the fume or vacuum system.

In order that the phosphoric acid may be used in subsequent reactions, such as for example, in the manufacture of triple superphosphate, it is necessary to remove the gypsum from the acid. This may be done in a number of ways, the most common of which is by filtration. The ease with which gypsum can be removed from the phosphoric acid depends entirely upon the physical conditions of the gypsum, that is, the size and shape of the gypsum crystals.

It is therefore an object of this invention to provide an improved process for producing phopshoric acid by the wet-process method.

Another object is to provide a method whereby filtration of gypsum crystals is improved in a wet-process phosphoric acid method.

A further object is to provide a method for controlling foam in a wet-process phosphoric acid method.

These and other objects of the invention will become evident from the specification and claims, taken with the accompanying drawings in which:

FIG. 1 is a photomicrograph of the gypsum crystal obtained by the previously mentioned reaction of phosphate rock with sulfuric acid, FIGS. 2 to 6 are photomicrographs of gypsum crystals obtained from the same reaction having an agent added to affect the crystal growth.

FIG. 7 is a graph showing relative foam inhibition.

We have found that the above objects may be attained by the use of the present invention which comprises the addition of a small amount of a composition comprising (1) ethylene oxide addition products of tall oil rosin, with or without (2) fatty acids to the wet-process phosphoric system to inhibit, prevent or reduce foam, and to obtain a more filterable gypsum crystal.

Adducts of ethylene oxide and tall oil rosin may be produced as is well known in the art, according to the process disclosed in U.S. Pat. 1,970,578 to Schoeller et al. The products are non-ionic surface active agents.

The number of moles of ethylene oxide per mole of tall oil rosin may be varied, but it has been found that a product particularly suited for the purposes of the invention is obtained when from about 5 to 20 preferably 8 to 12 moles ethylene oxide are used for each mole of tall oil rosin. In place of tall oil rosin, other naturally occurring fatty materials could be used to form the adducts such as tallow fatty acid, coconut oil fatty acids, and the like containing fatty acids having from about 12 to 18 carbon atoms.

The non-ionic surfactants of the present invention were prepared by charging freshly chipped tall oil rosin to an autoclave, adding sodium hydroxide catalyst (1% on weight of rosin used), and adding ethylene oxide at 140° C.

The runs made are summarized below.

| Moles ethylene oxide per mole rosin: | Number of runs made |
|---|---|
| 5 | 3 |
| 6 | 1 |
| 8 | 2 |
| 9 | 1 |
| 10 | 3 |
| 12.5 | 2 |
| 18 | 1 |

The various adducts are designated REO followed by the number of moles of ethylene oxide added multiplied by ten. Thus the adduct of five moles of ethylene oxide would be REO 50, and so on for the remaining adducts. These materials are amber liquids (REO 50 to 100) or waxy solids (REO 125 and 180) exhibiting a typical greenish fluorescence. Typically, REO 100 has a color (Gardner, 1963) of 14. Treatment with hydrogen peroxide results in a product with a color of 9.

REO 50 and 80 are slightly soluble in water; REO 100, 125, and 180 are readily water-soluble. The REO's are very soluble in perchloroethylene, acetone, xylene, and alcohols. They are not soluble in kerosene and fuel oil.

The amount REO adduct in the inventive foam inhibiting composition can vary from about 10 to 50%, preferably 20 to 40% of the total composition, with the balance being fatty acids.

As suitable fatty acids for use in the composition with the adducts are naturally occurring fatty acids such as tall oil fatty acids, tallow fatty acids, coconut oil fatty acids, and the like fatty materials containing fatty acids having from about 12 to 18 carbon atoms.

The amount of additive used in the wet-process phosphoric acid system will range from 0.001 to 1.0%.

The following specific examples are set forth to illustrate the invention and are not intended to be limitative.

FOAM INHIBITION IN WET-PROCESS PHOSPHORIC ACID SYSTEMS

Example 1

The purpose of the test in this example was to develop a foam control agent for wet-process phosphoric acid systems using one or more of the REO series.

Using an arbitrary blend of 59 parts tall oil fatty acid (Acintol FA-1, Arizona Chemical Co.) and 50 parts surfactant, REO 50, 80, 100, and 125 were tested as foam control agents. The formulations are shown in Table I. These formulations were evaluated in wet-process phosphoric acid using an aeration test described in a paper presented to the Society of Mining Engineers, October 1966, "Evaluation of Foam Control Agents for Wet Phosphoric Acid System," J. J. Garbarino, F. L. Encke, and J. T. Geoghegan. Optimum results were obtained with a blend consisting of 50 parts REO 100 and 50 parts tall oil fatty acid. This blend (Formulation No. S7700-48C) was found to be superior than Arizona 302 (a fatty acid base defoamer from Arizona Chemical Co.). The results are shown in Table II and FIG. 7.

TABLE I.—FOAM CONTROL AGENT FORMULATIONS FOR WET-PROCESS PHOSPHORIC ACID

| Agents, weight percent | Experimental formulation #'s S7700— | | | |
|---|---|---|---|---|
| | 48A | 48B | 48C | 48G |
| Acintol® FA-1 tall oil fatty acid | 50 | 50 | 50 | 50 |
| REO 50 | 50 | | | |
| REO 80 | | 50 | | |
| REO 100 | | | 50 | |
| REO 125 | | | | 50 |

TABLE II.—EVALUATION OF FOAM CONTROL AGENTS IN WET-PROCESS PHOSPHORIC ACID

| Time, Min. | Foam height in ml. | | | | | | |
|---|---|---|---|---|---|---|---|
| | Blank | Acintol FA-1 | Arizona 302 | Experimental formulations #S7700— | | | |
| | | | | 48A | 48B | 48C | 48G |
| 0.5 | 760 | 670 | 360 | 360 | 360 | 360 | 360 |
| 1.0 | >1,000 | 780 | 360 | 360 | 370 | 360 | 370 |
| 1.5 | | 870 | 360 | 370 | 380 | 360 | 370 |
| 2.0 | | 910 | 370 | 370 | 380 | 360 | 370 |
| 2.5 | | 930 | 370 | 380 | 380 | 360 | 380 |
| 3.0 | | 980 | 370 | 380 | 380 | 360 | 380 |
| 4.0 | | >1,000 | 380 | 420 | 400 | 360 | 400 |
| 5.0 | | | 390 | 450 | 420 | 360 | 420 |
| 6.0 | | | 410 | 480 | 430 | 370 | 450 |
| 10.0 | | | 530 | 700 | 560 | 400 | 660 |

Test conditions.—Temperature=75° C.; Amount foam control agent used=0.02 ml.; Test liquor=Plant grade phosphoric acid slurry from American Cyanamid Co., Brewster, Florida, #S7700-12B, approx. 31% P₂O₅ content.

Example 2

In this example a second series of formulations were prepared in which 80 parts of tall oil fatty acid and 20 parts of surfactants were used. The formulations are shown in Table III. In this series, REO 50, 60, 80, 90, 100, 125, and 180 were evaluated as foam control agents. The results are shown in Table IV. Optimum results were again obtained with the blend utilizing REO 100 (Formulation #S7700-150E) as shown in Table IV. This formulation (Formulation S7700-150E) was found to be equal to or superior than Arizona 302, Hess D-501, Tenn. OA-5, and Swift 67A, commercially available foam control agents from Arizona Chemical Co., Hess Oil Co., Tenneco Chemical Co., and Swift and Co., respectively.

TABLE III.—FOAM CONTROL AGENT FORMULATIONS FOR WET-PROCESS PHOSPHORIC ACID

| Agents, weight percent | Experimental formulation #'s S7700-150— | | | | | | |
|---|---|---|---|---|---|---|---|
| | A | B | C | D | E | F | G |
| Acintol® FA-1 tall oil fatty acid | 80 | 80 | 80 | 80 | 80 | 80 | 80 |
| REO 50 | 20 | | | | | | |
| REO 60 | | 20 | | | | | |
| REO 80 | | | 20 | | | | |
| REO 90 | | | | 20 | | | |
| REO 100 | | | | | 20 | | |
| REO 125 | | | | | | 20 | |
| REO 180 | | | | | | | 20 |

Example 3

A second but equally important objective of this invention was to provide a control agent which would be prepared from inexpensive materials. In this example, substitution was made of the tall oil fatty acid portion of the above blends made in Example I and II with Acintol® A-20 heads (a considerably less expensive material). Acintol® A-20 heads contains tall oil fatty acids as well as some unsaponifiable materials. A series of formulations were prepared in which from 10-50% of REO 100 was incorporated into A-20 heads, as shown in Table V. Optimum results were obtained with a blend consisting of 30% REO 100 and 70% Acintol® A-20 heads. This blend (Formulation S7700-154C) was evaluated in four different types of wet-process phosphoric acid, as shown in Tables VI, VII, VIII, and IX. The phosphoric acid types are shown on the tables.

TABLE IV.—EVALUATION OF FOAM CONTROL AGENTS IN WET-PROCESS PHOSPHORIC ACID

| Time, min. | Foam height in ml. | | | | | | | | | | | |
|---|---|---|---|---|---|---|---|---|---|---|---|---|
| | Blank | Acintol FA-1 | Arizona 302 | Hess D-501 | Tenn. OA-5 | Swift 67-A | Experimental formulation #'s S7700-150— | | | | | |
| | | | | | | | A | B | C | D | E | F | G |
| 0.5 | 550 | 730 | 380 | 600 | 380 | 450 | 460 | 450 | 420 | 400 | 410 | 440 | 550 |
| 1.0 | 870 | 910 | 380 | 690 | 380 | 460 | 480 | 470 | 430 | 420 | 420 | 450 | 590 |
| 1.5 | >1,000 | >1,000 | 400 | 760 | 410 | 480 | 500 | 500 | 440 | 430 | 440 | 480 | 650 |
| 2.0 | | | 420 | 860 | 450 | 510 | 530 | 530 | 460 | 440 | 450 | 490 | 700 |
| 2.5 | | | 440 | 930 | 500 | 550 | 550 | 560 | 470 | 460 | 460 | 520 | 760 |
| 3.0 | | | 460 | >1,000 | 560 | 600 | 590 | 510 | 480 | 470 | 540 | 820 |
| 4.0 | | | 510 | | 630 | 690 | 670 | 680 | 570 | 520 | 530 | 600 | 920 |
| 5.0 | | | 580 | | 740 | 790 | 800 | 760 | 630 | 600 | 610 | 700 | >1,000 |
| 6.0 | | | 640 | | 890 | 880 | 950 | 830 | 710 | 690 | 670 | 800 | |
| 10.0 | | | 940 | | >1,000 | >1,000 | >1,000 | >1,000 | 970 | 950 | 940 | >1,000 | |

Test conditions.—Temperature=75° C.; Amount foam control agent used=0.02 ml.; Test liquor=Plant grade phosphoric acid slurry from Cyanamid, Bradley, Florida, #S7700-64A, approx. 31% P₂O₅ content.

In Table VI and VII formulation C was found to be superior to Arizona 302, Hess D-501, Swift 67A, and Tenn. OA-5.

In Table VIII, formulation C was found to be superior to all but Arizona 302.

In Table IX, formulation C was found to be equal to Arizona 302 and superior to all others.

TABLE V.—FOAM CONTROL AGENT FORMULATIONS FOR WET-PROCESS PHOSPHORIC ACID

| Agents, weight percent | Experimental formulation #'s S7700-154— | | | | |
|---|---|---|---|---|---|
| | A | B | C | D | E |
| Acintol® A-20 heads | 90 | 80 | 70 | 60 | 50 |
| REO 100 | 10 | 20 | 30 | 40 | 50 |

It is readily apparent from Example I to III, that the additives of the present invention are excellent for preventing or inhibiting foam in the wet-process phosphoric acid method.

ENHANCEMENT OF GYPSUM CRYSTAL GROWTH IN WET-PROCESS PHOSPHORIC ACID SYSTEMS

Example 5

Gypsum crystals were grown in a wet-process phosphoric acid media using the method described by R. L. Gilbert, Jr., "Crystallization of Gypsum in Wet-Process Phosphoric Acid," Industrial and Engineering Chemistry Process and Development, vol. 5, No. 4, pp. 388–391.

The materials used were typical strong acids from American Cyanamid's Door-Oliver type phosphoric acid

TABLE VI.—EVALUATION OF FOAM CONTROL AGENTS IN WET-PROCESS PHOSPHORIC ACID

| | Foam height in ml. | | | | | | | | | | |
|---|---|---|---|---|---|---|---|---|---|---|---|
| Time, min. | Blank | A-20 heads | Acintonic 150 | Arizona 302 | Hess D-501 | Tenn. OA-5 | Swift 67-A | Experimental formulation #'s S7700-154— | | | |
| | | | | | | | | A | B | C | D | E |
| 0.5 | 730 | 550 | 880 | 350 | 390 | 420 | 360 | 400 | 390 | 350 | 350 | 490 |
| 1.0 | 970 | 660 | >1,000 | 350 | 370 | 430 | 360 | 410 | 350 | 350 | 350 | 450 |
| 1.5 | >1,000 | 770 | | 360 | 360 | 500 | 370 | 450 | 350 | 350 | 350 | 480 |
| 2.0 | | 850 | | 360 | 360 | 660 | 380 | 480 | 350 | 350 | 350 | 500 |
| 2.5 | | 940 | | 360 | 360 | 830 | 410 | 490 | 350 | 350 | 350 | 580 |
| 3.0 | | >1,000 | | 360 | 370 | >1,000 | 420 | 510 | 350 | 350 | 350 | 630 |
| 4.0 | | | | 360 | 400 | | 450 | 550 | 350 | 350 | 350 | 770 |
| 5.0 | | | | 360 | 580 | | 530 | 600 | 360 | 350 | 350 | 920 |
| 6.0 | | | | 360 | 810 | | 600 | 650 | 360 | 350 | 350 | >1,000 |
| 10.0 | | | | 410 | >1,000 | | 890 | 880 | 580 | 360 | 380 | |

Test conditions.—Temperature=75° C.; Amount foam control agent=0.02 ml.; Test liquor=Plant grade phosphoric acid slurry, from Cyanamid, Brewster, Florida, # S7700-12B, approx. 31% P₂O₅ content.

TABLE VII.—EVALUATION OF FOAM CONTROL AGENTS IN WET-PROCESS PHOSPHORIC ACID

| | Foam height in ml. | | | | | | | | | | |
|---|---|---|---|---|---|---|---|---|---|---|---|
| Time, min. | Blank | A-20 heads | Acintonic 150 | Arizona 302 | Hess D-501 | Tenn. OA-5 | Swift 67-A | Experimental formulation #'s S7700-154— | | | |
| | | | | | | | | A | B | C | D | E |
| 0.5 | 670 | 560 | 770 | 350 | 380 | 360 | 350 | 410 | 350 | 350 | 350 | 360 |
| 1.0 | 840 | 650 | 940 | 350 | 360 | 380 | 350 | 410 | 350 | 350 | 350 | 360 |
| 1.5 | >1,000 | 730 | 1,000 | 350 | 360 | 430 | 350 | 420 | 360 | 350 | 350 | 360 |
| 2.0 | | 760 | | 350 | 370 | 480 | 360 | 430 | 360 | 350 | 350 | 360 |
| 2.5 | | 830 | | 350 | 380 | 540 | 360 | 450 | 360 | 350 | 350 | 360 |
| 3.0 | | 910 | | 350 | 400 | 610 | 360 | 440 | 360 | 350 | 360 | 360 |
| 4.0 | | >1,000 | | 350 | 430 | 700 | 370 | 420 | 360 | 350 | 360 | 360 |
| 5.0 | | | | 360 | 440 | 820 | 380 | 380 | 360 | 350 | 360 | 360 |
| 6.0 | | | | 370 | 510 | >1,000 | 350 | 380 | 360 | 350 | 370 | 370 |
| 10.0 | | | | 500 | 950 | | 560 | 880 | 710 | 530 | 510 | 970 |

Test conditions.—Temperature=75° C.; Amount foam control agent used=0.02 ml.; Test liquor=Plant grade phosphoric acid slurry from Cyanamid, Bradley, Florida, # S7700-64A, approx. 31% P₂O₅ content.

TABLE VIII.—EVALUATION OF FOAM CONTROL AGENTS IN WET-PROCESS PHOSPHORIC ACID

| | Foam height in ml. | | | | | | | | | | |
|---|---|---|---|---|---|---|---|---|---|---|---|
| Time, min. | Blank | A-20 heads | Acintonic 150 | Arizona 302 | Hess D-501 | Tenn. OA-5 | Swift 67-A | Experimental formulation #'s S7700-154— | | | |
| | | | | | | | | A | B | C | D | E |
| 0.5 | 710 | 690 | 850 | 390 | 520 | 430 | 460 | 550 | 540 | 530 | 630 | 660 |
| 1.0 | 930 | 880 | >1,000 | 400 | 550 | 570 | 530 | 640 | 610 | 510 | 630 | 720 |
| 1.5 | >1,000 | >1,000 | | 400 | 580 | 770 | 550 | 720 | 680 | 520 | 660 | 750 |
| 2.0 | | | | 400 | 600 | 960 | 580 | 810 | 750 | 550 | 700 | 800 |
| 2.5 | | | | 400 | 610 | >1,000 | 600 | 890 | 800 | 600 | 780 | 800 |
| 3.0 | | | | 420 | 650 | | 630 | 980 | 880 | 600 | 840 | 920 |
| 4.0 | | | | 450 | 730 | | 670 | >1,000 | 920 | 700 | 910 | 930 |
| 5.0 | | | | 470 | 750 | | 690 | | 950 | 720 | 950 | 990 |
| 6.0 | | | | 490 | 800 | | 780 | | 960 | 750 | 980 | >1,000 |
| 10.0 | | | | 580 | >1,000 | | >1,000 | | >1,000 | 820 | >1,000 | |

Test conditions.—Temperature=75° C.; Amount foam control agent used=0.02 ml.; Test liquor=Plant grade phosphoric acid slurry from Cyanamid, Bradley, Florida, # S7700-64B, approx. 31% P₂O₅ content.

TABLE IX.—EVALUATION OF FOAM CONTROL AGENTS IN WET-PROCESS PHOSPHORIC ACID

| | Foam height in ml. | | | | | | | | | | |
|---|---|---|---|---|---|---|---|---|---|---|---|
| Time, min. | Blank | A-20 heads | Acintonic 150 | Arizona 302 | Hess D-501 | Tenn. OA-5 | Swift 67-A | Experimental formulation #'s S7700-154— | | | |
| | | | | | | | | A | B | C | D | E |
| 0.5 | 550 | 560 | 640 | 360 | 430 | 360 | 360 | 360 | 350 | 360 | 360 | 360 |
| 1.0 | 620 | 600 | 870 | 360 | 410 | 360 | 360 | 360 | 360 | 360 | 360 | 360 |
| 1.5 | 650 | 620 | 920 | 360 | 410 | 370 | 360 | 360 | 360 | 360 | 360 | 360 |
| 2.0 | 680 | 640 | >1,000 | 360 | 400 | 370 | 360 | 360 | 360 | 360 | 360 | 360 |
| 2.5 | 730 | 670 | | 360 | 400 | 380 | 360 | 360 | 360 | 360 | 360 | 360 |
| 3.0 | 760 | 710 | | 360 | 380 | 390 | 360 | 360 | 360 | 360 | 360 | 370 |
| 4.0 | 800 | 750 | | 360 | 370 | 420 | 360 | 360 | 360 | 360 | 360 | 380 |
| 5.0 | 880 | 770 | | 360 | 380 | 470 | 360 | 370 | 360 | 360 | 360 | 380 |
| 6.0 | 960 | 840 | | 360 | 410 | 530 | 370 | 370 | 360 | 360 | 360 | 390 |
| 10.0 | >1,000 | 930 | | 360 | 470 | 760 | 370 | 390 | 370 | 360 | 360 | 420 |

Test conditions.—Temperature=75° C.; Amount foam control agent used=0.01 ml.; Test liquor=Plant grade phosphoric acid; from Electric Reduction of Canada, Ltd., Canada, # S7700-63, approx. 31% P₂O₅ content.

plant at Bradley, Fla., made from uncalcined Florida rock. Concentrations were adjusted with reagent grade materials: $H_3PO_4$, $H_2PO_4$, $Al_2O_3$, $Fe_2O_3$, $H_2SiF_6$, HF.

In crystallizing gypsum, as constant an environment as possible for crystallization was maintained. The following procedure was used to maintain constant concentrations of $P_2O_5$ and $H_2SO_4$.

In a polyethylene Erlenmeyer flask were placed 100 grams of acid of the desired composition. The flask was placed in a hot water bath and brought to 70° C.

In a second flask were placed 100 grams of the same solution to which were added 3.5 grams of concentrated reagent grade $H_2SO_4$.

In a third flask, 100 grams of "calcium charge" was made up. This was of the same $P_2O_5$ concentration as the above solutions and contained 3.7 grams of reagent $Ca_3(PO_4)_2$, equivalent to the excess $H_2SO_4$ added to the second flask.

The second and third solutions were heated to 70° C. and poured simultaneously into the reaction flask. The flask was then stoppered and shaken in the water bath for 3 to 4 hours. Samples were taken at the first appearance of crystals, and at intervals thereafter, by inserting a filter stick and applying vacuum. The crystals on the filter stick were immediately washed with acetone and air-dried. The dried samples were examined microscopically. In a series of samples which showed sufficient habit modification to be of interest, a photomicrograph was made, usually of the last sample in the time sequence. The mounting medium for these samples was mineral oil, n=about 1.48.

According to the this method, six samples containing gypsum crystals were prepared with additives as follows.

| Sample: | Additives |
| --- | --- |
| S 7700–141A | Blank |
| S 7700–141B | 0.225 g. REO 50. |
| S 7700–141C | 0,225 g. REO 80. |
| S 7700–141D | 0.225 g. REO 100. |
| S 7700–141E | 0.225 g. REO 125. |
| S 7700–141F | 0.225 g. REO 180. |

Sample 141A was a control sample with no additive; the other samples represented the products of crystallization tests with different additives in the system.

The solids in all samples consisted of abundant gypsum and a minor phase or phases (possibly one or more silicoflorides) in equant crystals. In addition, Samples 141E and 141F contained transistory columnar crystals of $2CaSO_4 \cdot H_2O$. The hemi-hydrate was moderately abundant when these two samples were first examined but was apparently unstable in cold acid. It was entirely absent several days later when the photomicrographs were taken. In the meantime, however, some of the solids had been filtered out and dried so that the hemi-hydrate could be positively identified under the petrographic microscope.

In all six samples the gypsum occurred mostly in bladed crystals, with some small rhombs and a few long columnar crystals. In Sample 141A the blades were generally untwinned, but in the other five samples at least a great majority of the blades were contact twins, with the contact line running longitudinally. In all samples the blades showed considerable range in size and length: width ratios. Several measurements were taken of blades and columns to show these variations as seen in sub-samples taken from the jars with a medicine dropper. There is no assurance that the indicated ranges are fully representative. The measurements in microns are given below by samples. Unless otherwise indicated, the measurements are for bladed crystals.

Sample 141A:
  (microns)
  5.5 x 272
  9.5 x 82
  11 x 286
  24 x 122
  30 x 163
  4 x 150 columnar
  41 x 150 columnar
Sample 141B:
  (microns)
  8 x 122
  41 x 82
  41 x 218
  48 x 272
  54 x 625
  14 x 272 columnar
Sample 141C:
  (microns)
  4 x 48
  14 x 231
  27 x 54
  27 x 204
  31 x 368
  20 x 462 columnar Sample 141D:
  (microns)
  5.5 x 95
  14 x 177
  27 x 211
  30 x 95
  30 x 340
  30 x 191 columnar
Sample 141E:
  (microns)
  1.4 x 41
  5.5 x 61
  14 x 129
  90 x 762
  95 x 408
  109 x 286
  122 x 435
  23 x 306 columnar
Sample 141F:
  (microns)
  4 x 54
  7 x 61
  41 x 722
  57 x 282
  71 x 381
  150 x 408
  14 x 95 columnar
  20 x 422 columnar Photomicrographs taken of the samples by transmitted light are shown in FIGS. 1 to 6 at 60X. A print of a finely ruled scale 2 mm long has been superposed at the same magnification. Each small division of the scale represents 10 microns in the field.

Visual comparison of the photomicrographs shows a definite change in crystal structure to a more filterable form.

Thus, it will be seen from the examples that the addition of the REO adducts to a wet-process phosphoric acid serves both to inhibit foam and to enhance gypsum crystal growth and therefore improve filterability. There is therefore a very beneficial effect on the entire process. The REO adducts may be added at any time in the process prior to commencement of the formation of gypsum crystals in order to enhance crystal growth. To obtain the foam inhibiting effect, the REO adducts should be added early in the process. When this is done, it may or may not be necessary to add additional adduct later for crystal enhancement, depending on the amount of adduct added, the type of phosphate rock being used and other process variables. When the REO adducts are added only for crystal enhancement, they need not be in combination with fatty acids.

While we have disclosed certain specific embodiments and preferred modes of practice of our invention, this is solely for illustration, and it will be understood that various changes and modifications may be made in the invention without departing from the spirit of the disclosure or the scope of the appended claims.

We claim:
1. In the process for producing wet-process phosphoric acid by reacting phosphate rock with sulfuric acid in which gypsum is produced as a byproduct the improvement which comprises a method for enhancing the growth of gypsum crystals which comprises the step comprising the addition of about 0.001 to 1 percent of a composition consisting essentially of an adduct obtained by reacting from 6 to 20 mols of ethylene oxide with one mol of tall oil rosin; said composition being added prior to crystal formation.

2. The method of claim 1 wherein said adduct has from about 8 to 12.5 moles of ethylene oxide.

3. The method of claim 1 wherein said composition comprises in addition fatty acids.

4. The method of claim 3 wherein the fatty acid used in the composition in combination with the adduct is tall oil fatty acid.

5. The method of claim 3, said composition comprising from about 10 to 50% of said adduct with the remainder being fatty acids.

6. The method of claim 5 wherein said fatty acids are tall oil fatty acids.

References Cited

UNITED STATES PATENTS

| | | | |
|---|---|---|---|
| 2,666,017 | 1/1954 | Moss et al. | 252—321 |
| 3,000,835 | 9/1961 | Mayhew et al. | 252—358 |
| 3,238,142 | 3/1966 | Perry | 252—321 |

OTHER REFERENCES

"Defoamers," Industrial and Engineering Chemistry, vol. 44, No. 2, February 1952, pp. 346–348.

OSCAR R. VERTIZ, Primary Examiner

G. A. HELLER, Assistant Examiner

U.S. Cl. X.R.

23—122; 252—321, 358